Jan. 15, 1935.  G. E. NERNEY  1,987,702
EYEGLASS CONSTRUCTION
Filed May 4, 1932
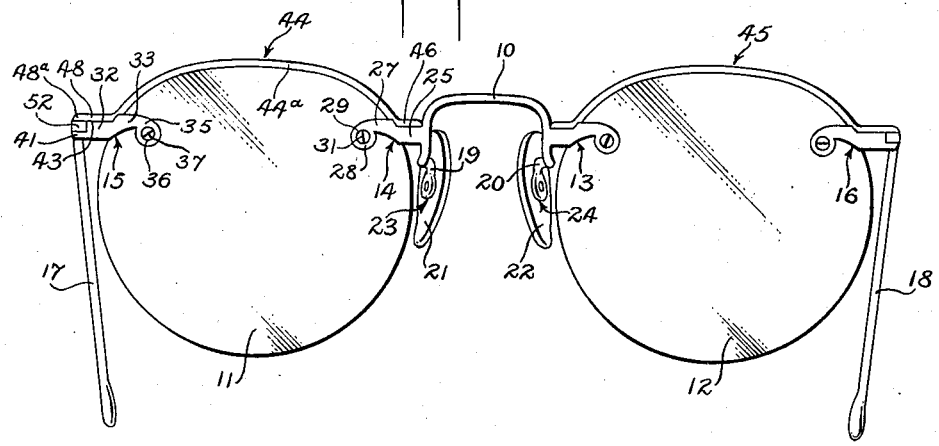
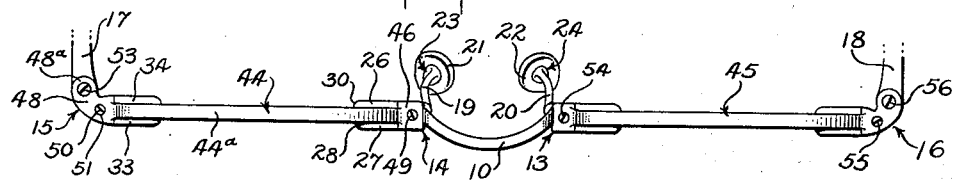
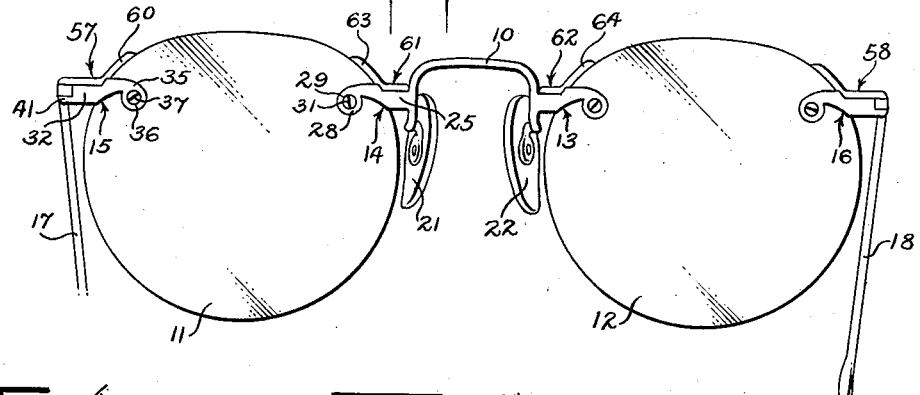
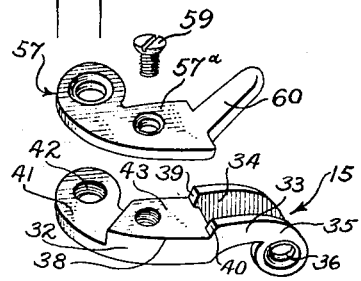
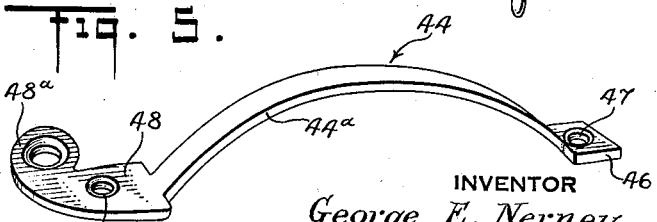
INVENTOR
George E. Nerney
BY
ATTORNEYS Patented Jan. 15, 1935

1,987,702

UNITED STATES PATENT OFFICE 1,987,702

EYEGLASS CONSTRUCTION

George E. Nerney, Attleboro, Mass., assignor to Bay State Optical Company, Attleboro, Mass., a corporation of Maine Application May 4, 1932, Serial No. 609,149

18 Claims. (Cl. 88—47)

This invention relates to an eyeglass construction.

One of the objects of this invention is to provide an eyeglass construction whose primary characteristics will be simplicity, practicability and durability. Another object is to provide a device of the above character whose manufacture will be economical both from the standpoint of labor and materials used. Another object is to provide a device of the above character whose strength is greatly increased due to the durability and lasting quality of certain of the more vulnerable portions thereof. Another object is to provide a device of the above character whose assembly may be easily and quickly accomplished. Another object is to provide a device of the above character having the appearance of a rimless pair of spectacles while preserving to a marked degree the more durable characteristics found in the rim construction. Another object is to provide a device of the above character whose construction will be versatile, certain of the parts thereof being so constructed as to permit an interchange with certain other parts thereof. Other objects will be in part obvious or in part pointed out hereinafter.

The invention accordingly consists in the features of construction, combinations of elements and arrangements of parts as will be exemplified in the structure to be hereinafter described, and the scope of the application of which will be indicated in the following claims.

In the accompanying drawing, in which is shown several of the various possible embodiments of this invention, Figure 1 is a front elevation of an eyeglass frame including certain features of my invention;

Figure 2 is a top plan view of the frame shown in Figure 1, certain of the parts thereof being broken away;

Figure 3 is a front elevation of an eyeglass frame, included in which are certain other features of my invention;

Figure 4 is an exploded perspective view of certain of the parts of the frame shown in Figure 3, and Figure 5 is a perspective view of a part of the frame shown in Figure 1.

Similar reference characters refer to similar parts throughout the several views of the drawing.

As conducive to a more definite understanding of certain features of this invention, it might here be pointed out that in eyeglass frames and, more particularly, those frames of the rimless construction, the inherent delicacy of certain of the parts thereof has continued to detract from the practicability of such a construction. Sometimes the structural weaknesses of such a frame are magnified when the temples and endpieces thereof are secured to the lenses at points spaced from the transverse axes thereof. The peculiar position which the endpieces must occupy under such circumstances presents many new problems and difficulties which must be solved in order to secure a tight, yet safe and lasting fit between the endpiece and the lens. Another prevalent weakness of the rimless construction is the tremendous burden which is placed upon the lenses per se. The lenses themselves must act as the main foundation or support for the entire frame. Consequently they must be able to withstand certain stresses and strains placed upon them by twisting various parts of the frame, as, for example, the temples and the bridge. As glass is inherently brittle, such twisting often results in breakage of one or more of the lenses. One of the various objects of this invention is to provide a device in which all of the above-mentioned difficulties are successfully and efficiently overcome.

Referring more particularly to Figure 1, there is shown an eyeglass frame which will hereinafter be termed a "semi-rimless" frame. This semi-rimless frame includes a bridge 10 connected to two lenses 11 and 12 by two members generally indicated at 13 and 14 respectively. Connected to the opposite end of lenses 11 and 12 are two endpieces generally indicated at 15 and 16, in turn connected to two temples 17 and 18 respectively. The opposite ends 19 and 20 of bridge 10 extend downwardly and rearwardly (Figures 1 and 2) and are connected to two nose pads 21 and 22 preferably by ball and socket joints generally indicated at 23 and 24.

Endpieces 15 and 16 are preferably secured to lenses 11 and 12 respectively at substantially aligned points spaced from the transverse axes of the lenses. Also, I prefer to secure members 13 and 14 to the lenses at points spaced from the transverse axes of the lenses and substantially in alignment with the points of connection of endpieces 15 and 16. By so positioning endpieces 15 and 16 and members 13 and 14, the amount of leverage therebetween is reduced to a minimum so that in the event of any twisting action as, for example, if temple 18 was forced upwardly and temple 17 downwardly, this decrease in leverage would tend to reduce the strain on the lenses.

It might here be noted that any reference hereinbefore or hereinafter to an "outward" direction signifies a direction away from the periphery of either of lenses 11 and 12, the term "inward" denoting a direction opposite thereto, while a "rearward" direction refers to a direction away from the front of the frame or normally toward the face of the wearer. Also, a "downward" direction indicates a direction toward the foot of the drawing, while an "upward" direction is the opposite thereof.

As each side of the frame shown in Figure 1 from a center point on the bridge 10 is substantially similar, the details of construction of one side only will be described minutely. Still referring to Figure 1, member 14 may be connected to bridge 10 in any convenient manner so that it extends inwardly from the bridge to form a saddle portion 25 whose inner surface rests substantially against the edge of lens 12. Extending inwardly and connected to saddle portion 25 are two arms 26 and 27, as more clearly shown in Figure 2, these arms being so spaced from each other that lens 12 fits therebetween and preferably rests upon their opposing surfaces. The inner surface of saddle portion 25, or that surface resting against the edge of lens 12, is shaped to correspond to that portion of the edge so that saddle portion 25 together with arms 26 and 27 snugly embraces the lens. The inner extremity of arm 27 (Figure 1) extends downwardly to form a portion 28 thereof in which there is a hole 29, the axis of which is preferably below the center point of saddle portion 25, as viewed in Figure 1. Arm 26 (Figure 2) has a portion 30 substantially similar in shape and position to portion 28; that a screw 31 extends through portion 28, lens 12, and is threaded into portion 30. Accordingly, with screw 31 in position, lens 12 is held securely within member 14 and consequently connected to bridge 10.

Endpiece 15 includes a body portion 32 whose inner surface (that surface in engagement with the edge of lens 11) is shaped to correspond to the periphery of the lens at the point of its position (Figure 1). Extending inwardly from body portion 32 are two arms 33 and 34 (Figure 2) substantially similar in construction to arms 26 and 27. The inner extremities of arms 33 and 34 extend downwardly toward the transverse axis of the lens (arm 33 in Figure 1 being an illustrative example of the shape and position of both arms 33 and 34). Thus, a hole 36 extends through the inner portion 35 of arm 33 and a screw 37 extends through arm 33, the lens 11 to be threaded into arm 34 (Figure 2). In this manner, endpiece 15 is held firmly connected to lens 11 against displacement in any direction and it should be particularly noted that, due to the shape of the inner edge of body portion 32, as described above, endpiece 15 cannot move downwardly or pivot about screw 37 in a counter-clockwise direction.

Referring now to Figure 4, body portion 32 thereof is undercut as at 38 so that the outer ends of arms 34 and 35 form two shoulders 39 and 40 respectively adjacent the top surface of body portion 32. As best shown in Figures 2 and 4, body portion 32 extends outwardly and rearwardly from the edge of lens 12. Substantially spaced from shoulders 39 and 40 is a second undercut in body portion 32 to form a lug 41 having a hole 42 extending therethrough. Accordingly, body portion 32 has two top surfaces, namely, a top surface 43 adjacent shoulders 39 and 40 and the top surface of lug 41.

Connecting endpieces 15 and 16 with members 14 and 13 respectively are two rim parts generally indicated at 44 and 45. The main body portion 44a of rim part 44 is shaped to substantially follow the top periphery of lens 11. Extending from one end of body portion 44a is a lug 46 having a hole 47 extending therethrough, while secured to and preferably integral with the other end of body portion 44a is a member 48. Member 48 is substantially similar in shape and general outline to body portion 32 (Figure 4). Accordingly, as more clearly shown in Figure 1, part 44 extends along the top edge of lens 11, and lug 46 thereof rests upon the top surface of saddle portion 25, while member 48 rests upon surface 43 (Figure 4) of body portion 32 so that its inner end portion abuts against shoulders 39 and 40, the outer end 48a thereof being substantially in registry with lug 41 (Figure 4).

As more clearly shown in Figure 2, a screw 49 extends through hole 47 (Figure 5) in lug 46 and is threaded into saddle portion 25. Preferably the axis of screw 49 is substantially at right angles to the transverse axis of lens 11. Similarly, a screw 50 extends through a hole 51 (Figure 5) and is threaded into body portion 32 of endpiece 15, preferably the axis thereof being substantially parallel to the axis of screw 49. The end portion 52 (Figure 1) of temple 17 fits between end portion 48a of member 48 and lug 41 (Figures 1 and 4) and is held in this position by a screw 53 extending through member 48, temple 17, and threaded into lug 41.

Rim part 45 is substantially similar in shape to rim part 44 thus being connected to member 13 by way of a screw 54 (Figure 2) and to endpiece 16 by a screw 55, the details of this construction being substantially similar to that described above with reference to part 44. Likewise, a screw 56 connects temple 18 to endpiece 16 and the outer extremity of rim part 45.

Returning to Figure 2, it will be seen that by having screws 49, 54, 50 and 55 at right angles to the transverse axes of lenses 11 and 12, the ultimate strength of the entire frame is materially increased. I have found that in practice most strains or stresses which may be placed upon the threads of these screws will not be in a direction parallel to the axes thereof. For example, if the two lenses are bent toward each other about bridge 10, the force exerted against screws 54 and 49 will be in a direction at an angle to the axes of these screws. Due to this sidewise force against the screws, the amount of displacing force is greatly reduced and, thus, the threads, one of the more fragile and troublesome portions of the frame, are more secure against serious damage.

Also, rim parts 44 and 45 act as a connecting brace between the bridge 10 and the endpieces 15 and 16. With the bridge construction including members 13 and 14 as a foundation, rim parts 44 and 45 coact to help support the weight of lenses 11 and 12 as well as the outer parts connected thereto. In the ordinary "rimless" construction this load must be borne practically in its entirety by the lenses themselves. In this manner the possibility of lens sag so frequently encountered in eyeglass frames and, more particularly, "rimless" frames, wherein the lenses sag toward each other thus to fall out of proper focus with the eyes, is completely and efficiently avoided. It should also be noted that rim parts 44 and 45 act as reinforcing elements for endpieces 15 and 16, thus preventing these parts from pivoting about their connecting screws as axes under various stresses and strains imparted thereto by twisting temples 17 and 18 in opposite directions, for example. Accordingly, by leaving the greater part of the peripheries of lenses 11 and 12 free and unprotected, I have achieved the appearance of a rimless frame while preserving many of the qualities of stability and durability usually found in frames containing rims.

Certain peculiar advantages are incident to the mounting of endpieces on lenses at points spaced from the transverse axes thereof, but a disadvantage resides in the greater weakness of the lenses, the top peripheries becoming more vulnerable to jams or the like. However, rim parts 44 and 45 serve as an extra protection for the peripheries of the lenses at such weak points.

In certain instances I have found it more desirable to construct a frame which is essentially rimless, as, for example, to suit the particular desires of the user. Such a construction may be achieved simply and effectively by changing some of the parts described above with reference to the frame shown in Figure 1.

Referring to Figure 3, there is shown a frame in which end pieces 15 and 16, bridge 10, temples 17 and 18, members 13 and 14, as well as nose pads 21 and 22 are substantially similar in construction to the frame shown in Figure 1. When rim parts 44 and 45 (Figure 1) are removed, parts generally indicated at 57 and 58 may be secured in their places upon endpieces 15 and 16. Referring to Figure 4, part 57 comprises a main body portion 57a substantially corresponding in shape to body portion 32 of endpiece 15. Thus, part 57 is secured to endpiece 15 by a screw 59 extending therethrough and threaded therein (Figure 4). Temple 17 is then connected between part 57 and lug 41 in a manner substantially similar to that described above. Extending from the inner end of part 57, as best shown in Figures 3 and 4, is a foot 60 substantially positioned between shoulders 39 and 40 to rest against a portion of the periphery of lens 11. Part 58 is substantially similar in shape and construction to part 57.

Referring more particularly to Figure 3, parts 61 and 62 are secured to the body portions of members 13 and 14 by suitable screws (not shown) and preferably integral therewith are two feet 63 and 64 respectively engaging portions of the peripheries of lenses 11 and 12. In this manner, the frame shown in Figure 1 including rim parts 44 and 45 may be converted into the rimless frame shown in Figure 3 by the simple operation of removing parts 44 and 45 and subsequently screwing parts 57, 58, 61 and 62 into place. When parts 57, 58, 61 and 62 are in position, the frame retains some of the durable qualities mentioned above with reference to the frame shown in Figure 1 while offering the added advantage of being of the rimless type.

I have discovered that such a frame may be manufactured in its entirety and shipped to the retailer with parts 57, 58, 61 and 62 as well as rim parts 44 and 45. Subsequently the retailer may convert the frame into either style desired by the customer and, as a matter of fact, all parts may be sold to the customer so that at some future time he may change from one style or construction to the other.

It will thus be seen that I have provided a thoroughly practical and efficient construction in which the several objects hereinabove mentioned as well as many others are successfully and efficiently achieved.

As many possible embodiments may be made of the above invention and as many changes might be made in the embodiments above set forth, it is to be understood that all matter hereinbefore set forth or shown in the accompanying drawing is to be interpreted as illustrative and not in a limiting sense.

I claim:

1. In eyeglass construction, in combination, a pair of lenses, means including a bridge connecting said lenses, a pair of members having arms embracing the opposite surfaces of said lenses and positioned substantially at the ends of said lenses remote from said means, said members having reduced lug portions extending outwardly from the periphery of said lenses, securing means extending through said arms and said lenses, a pair of parts substantially following the periphery of said lenses and connected to said means, said parts extending to said members so that portions thereof form lugs spaced from said first-mentioned lugs, securing means extending through said parts and said members, a pair of temples having tongues extending between said first and second mentioned lugs, and securing means extending through said lugs and said tongue.

2. In eyeglass construction, in combination, a lens, means including a bridge and connected to said lens; an endpiece including two arms embracing the opposite surfaces of said lens and a portion extending outwardly and rearwardly from the edge of said lens, substantially the remote end of said endpiece being reduced to form a lug; a part connected to said means and extending about a portion of the periphery of said lens to engage said endpiece, the remote end thereof being in registry with said lug, means for securing said part to said endpiece, securing means extending through said arms and said lens, a temple one end of which is located between said lug and said end portion of said part, and means for holding said temple in said position.

3. In eyeglass construction, in combination, a lens, a member secured to said lens, a bridge secured to said member, the top surface of said member being substantially flat, an endpiece connected to said lens, and a part having a portion the bottom surface of which is substantially flat and resting upon the top surface of said member, said part extending about and in engagement with the top surface of said lens and releasably secured to said endpiece and said member.

4. In eyeglass construction, in combination, a lens, a member secured to said lens, a bridge secured to said member, the top surface of said member being substantially parallel to the transverse axis of said lens, an endpiece connected to said lens, a part resting upon the top surface of said member extending about the top surface of said lens and secured to said endpiece, and a screw extending through said part and threaded into said member, the axis thereof being substantially at right angles to the transverse axis of said lens.

5. In eyeglass construction, in combination, a lens, a member secured to said lens and extending from the periphery thereof, a bridge secured to said member, said member having a top surface substantially parallel to the transverse axis of said lens, an endpiece including two inwardly extending arms embracing the surfaces of said lens and an outwardly and rearwardly extending portion, said portion including a top surface substantially parallel to said top surface of said member and a remote portion reduced to form a lug, securing means extending through said arms and said lens, a part resting upon both of said top surfaces and substantially following the periphery of said lens to connect said member to said endpiece, one end of said part being in registry with said lug, means for connecting said part to said member and said endpiece, a temple, and means for holding said temple between said end of said part and said lug.

6. In eyeglass construction, in combination, a lens, a member secured to said lens and extending from the periphery thereof, a bridge secured to said member, said member having a top surface substantially parallel to the transverse axis of said lens, an endpiece including two inwardly extending arms embracing the surfaces of said lens and an outwardly and rearwardly extending portion, said portion having a top surface substantially parallel to said top surface of said member and a remote portion reduced to form a lug, securing means extending through said arms and said lens, a rim part resting upon both of said top surfaces and substantially following the periphery of said lens to connect said member to said endpiece, one end of said part being in registry with said lug, a screw extending through said part and threaded into said member, said screw being substantially at right angles to said transverse axis, means connecting said part to said endpiece, a temple having a tongue, said tongue extending between said first-mentioned lug and said end of said part, and securing means extending through said last-mentioned end, said tongue and said lug.

7. In eyeglass construction, in combination, a lens, a member secured to said lens at a point spaced from the transverse axis thereof, said member having a top surface substantially parallel to said axis, an endpiece secured to said lens at a point in alignment with said first-mentioned point and including a portion extending outwardly and rearwardly from said lens, said portion being reduced to form a lug at its remote end, a part in engagement with said top surface of said member and extending about the periphery of said lens and along said endpiece so that the remote end thereof is in registry with said lug, a screw extending through said part and threaded into said member, said screw being substantially at right angles to said axis, means securing said part to said endpiece, a temple one end of which rests between said lug and said end of said part, and securing means extending through said end, said temple and said lug.

8. In eyeglass construction, in combination, a pair of lenses, a pair of members secured to said lenses, a bridge connected to each of said members, a pair of endpieces connected to said lenses at points spaced from said members, said endpieces and said members having top surfaces substantially parallel to each other, a pair of parts engaging said top surfaces and each releasably connecting one of said members to one of said endpieces, screws extending through said parts and threaded into each of said members, and screws extending through said parts and threaded into each of said endpieces whereby said parts and said endpieces may be readily disassociated.

9. In eyeglass construction, in combination, a pair of lenses, a pair of members secured to said lenses above the transverse axes thereof, a bridge connected to each of said members, a pair of endpieces connected to said lenses at points spaced horizontally opposite of and in alignment with said members, said endpieces and said members having top surfaces substantially parallel to each other, a pair of parts engaging said top surfaces and each connecting one of said members to one of said endpieces, screws extending through said parts and threaded into each of said members, screws extending through said parts and threaded into each of said endpieces, and temples pivotally connected to said endpieces.

10. In eyeglass construction, in combination, a pair of lenses, a pair of members secured to said lenses, a bridge connected to each of said members, a pair of endpieces connected to said lenses at points spaced from said members, said endpieces and said members having top surfaces substantially parallel to each other, a pair of parts engaging the top surfaces of said members and having portions extending along portions of the edges of said lenses, screws extending through said parts and into said members, a pair of parts engaging the top surfaces of said endpieces and having portions extending along portions of the edges of said lenses, and screws extending through said last-mentioned parts and into said endpieces.

11. In eyeglass construction, in combination, a pair of lenses, a pair of members secured to said lenses at points spaced from the transverse axes thereof, a bridge connected to each of said members, a pair of endpieces connected to said lenses at points in alignment with said first-mentioned points spaced from said members, said endpieces and said members having top surfaces substantially parallel to each other, a pair of parts engaging the top surfaces of said members and having portions extending along portions of the edges of said lenses, screws extending through said parts and into said members, a pair of parts engaging the top surfaces of said endpieces and having portions extending along portions of the edges of said lenses, and screws extending through said last-mentioned parts and into said endpieces.

12. In eyeglass construction, in combination, a lens, a member including two arms extending inwardly over the opposite surfaces of said lens and a portion extending outwardly and rearwardly from the edge of said lens, said portion being reduced substantially at the remote end thereof to form a lug, securing means extending through said arms and said lens, and a part adapted to engage said outwardly and rearwardly extending portion of said member, one end of said part being in registry with said lug and the other end thereof extending along a portion of the edge of said lens.

13. In eyeglass construction, in combination, a lens, a member including two spaced arms extending inwardly over the opposite surfaces of said lens and a portion reduced near the connecting ends of said arms to form a surface, said portion being reduced near its remote end to form a lug, a part adapted to fit upon said last-mentioned surface, one end thereof extending outwardly in registry with said lug and the other end thereof engaging a portion of the periphery of said lens, and a screw extending through said part and threaded into said member.

14. In eyeglass construction, in combination, a lens, a pair of arms engaging the opposite surfaces of said lens and connected to a member, means securing said arms to said lens at a point spaced from the transverse axis of said lens, said member extending outwardly from the periphery of said lens and having its remote end reduced to form a lug, a part fitting upon said member and having one end in substantial registry with said lug and the other end extending upwardly over a portion of the edge of said lens, and a screw extending through said part and threaded into said member.

15. In eyeglass construction, in combination, a lens, a pair of arms engaging the opposite surfaces of said lens, means securing said arms to said lens at a point spaced from the transverse axis thereof, a member one surface of which is in a plane substantially at an acute angle to the plane of the top surface of said member, said member being connected to said arms so that said first-mentioned surface rests against the edge of said lens, said member extending outwardly and rearwardly from said lens and having its remote end reduced to form a lug, a part fitting upon the top surface of said member and having one end thereof in substantial registry with said lug, an element connected to said part engaging a portion of the periphery of said lens above said part, and a screw extending through said part and threaded into said member.

16. In eyeglass construction, in combination, a lens, a member secured to said lens at a point spaced from the transverse axis thereof, said member having a flat top surface substantially parallel to said axis, an end piece secured to said lens at a point in alignment with said first-mentioned point and including a portion extending outwardly and rearwardly from said lens, a part removably secured to said top surface of said member and said end piece, said part following the periphery of said lens, and means securing said part to said member and said end piece, said means being independent of the connections between said lenses with said bridge and said end piece.

17. In eyeglass construction, in combination, a pair of lenses, means including a bridge connecting said lenses, a pair of saddle members connected to said lenses, a pair of parts in association with said means and extending along portions of the peripheries of said lenses, screws extending through said parts and threaded into said means, a second pair of saddle members connected to said lenses, a second pair of parts extending along portions of the peripheries of said lenses spaced from said first-mentioned parts and engaging said second-mentioned saddle members and screws extending through said second pair of parts and threaded into said second-mentioned saddle members.

18. In eyeglass construction, in combination, a lens, an end piece secured to said lens above the transverse axis thereof so that a portion of said end piece engages the edge of said lens, a part secured to the top of and extending from said end piece upwardly therefrom to engage the edge of said lens whereby pivotal movement of said end piece is prevented, a bridge member secured to said lens so that a portion thereof engages the edge of said lens, the top of said portion being substantially parallel to the top of said end piece, and a part secured to said portion extending upwardly from said bridge member to engage the edge of said lens whereby pivotal movement of said bridge member is prevented, both of said parts terminating short of each other and being in removable related assembly respectively with said end piece and said portion of said bridge member whereby their disassociation from the entire assembly does not effectuate a separation of said end piece from said lens or a separation of said bridge from said lens.

GEORGE E. NERNEY.